United States Patent [19]

Van Den Brink et al.

[11] Patent Number: 5,691,916
[45] Date of Patent: Nov. 25, 1997

[54] METHOD AND DEVICE FOR CALCULATING THE QUALITY OF TRANSMISSION MEDIA CONTAINING CODECS

[75] Inventors: Wilhelmus Albertus Christianus Van Den Brink, Zoetermeer; Michel Johannes Wilhelmus Maria Emons, Leidschendam; Robertus Laurentius Maria Dignum, Voorburg, all of Netherlands

[73] Assignee: Koninklijke PTT Nederland N.V., Groningen, Netherlands

[21] Appl. No.: 421,841

[22] Filed: Apr. 14, 1995

[30] Foreign Application Priority Data

May 6, 1994 [NL] Netherlands ............... 9400751

[51] Int. Cl.$^6$ .................................................. G06F 17/00
[52] U.S. Cl. ............................................................ 364/514 B
[58] Field of Search ........................ 364/514 R, 715.02, 364/514 B; 375/355, 370; 348/181, 189; 370/32.1

[56] References Cited

U.S. PATENT DOCUMENTS

| | | | |
|---|---|---|---|
| 4,578,797 | 3/1986 | Satoh et al. | 375/355 |
| 5,313,280 | 5/1994 | Straus | 348/181 |
| 5,533,121 | 7/1996 | Suzuki et al. | 370/355 |

OTHER PUBLICATIONS

Article entitled Subjective Quality of Several 9.6–32 kb/s Speech Coders, by W.R. Daumer, et al. published in Proceedings of the IEEE International Conference on Acoustics, Speech and Signal Processing, pp. 1709–1712, May, 1982.
Article entitled On Tandem Coding of Speech, by V. Ramamoorthy published in Proceedings of the IEE International Conference, pp. 1229–1233, Jun., 1985.

Primary Examiner—Ellis B. Ramirez
Attorney, Agent, or Firm—Frishauf, Holtz, Goodman, Langer & Chick

[57] ABSTRACT

A method of calculating the transmission quality of a series of cascaded codecs, wherein for each type of codec, a function is determined which is specific for the relationship between the Q-equivalent over a series of codecs of that same type and the number of codecs which said series includes. The type sequence is determined of the series of codecs such as those cascaded in the transmission medium. The series is traversed in steps and, starting from the Q-equivalent for one codec of the type which occurs as the first in the series of codecs, the Q-equivalent is always calculated over the traversed part of the series by calculating, starting from the Q-equivalent calculated last, the next Q-equivalent under the control of the function which is specific for the type of the last codec in said part which has been traversed. The Q-equivalent finally calculated for the entire codec series is converted into a MOS value which is a measure of the subjective quality of the codec series.

20 Claims, 4 Drawing Sheets

METHOD AND DEVICE FOR CALCULATING THE QUALITY OF TRANSMISSION MEDIA CONTAINING CODECS

BACKGROUND OF THE INVENTION

The invention relates to a method of calculating the transmission quality of a transmission medium containing a series of cascaded codecs. Such a calculation results in a "mean opinion score" (MOS), the measure of the speech quality which the average listener (network user) experiences. However, the MOS is used not only as a measure of the speech quality of speech codecs, but also in video codecs as a measure of the picture quality. Although the invention is deemed to lie, in particular, in the field of speech codecs, the field of other codecs, such as picture codecs, is not excluded from the field of the invention. The MOS can be calculated from a quality parameter referred to as "Q-equivalent" expressed in decibels which has been standardized by CCITT and which can be determined for one codec or for a cascaded series of codecs. There is a certain relationship between the MOS and the Q-equivalent (see FIG. 4), as a result of which Q-equivalents can be converted into MOS values. What the speech quality (expressed in Q-equivalent or MOS) of one codec is and also what the speech quality of a cascade circuit of a plurality of codecs of the same type is, is usually known. However, cascade circuits of codecs of various types are encountered in practice. The object of the invention is to provide a method of determining the Q-equivalent (and, from the latter, the MOS) for a series of cascaded codecs of different type, in which the influence of differences in type sequence is also manifested. The proposed method has the additional advantage that the Q-equivalent of a cascade circuit of codecs (whether of the same type or not) can be calculated in advance, that is to say without the cascade circuit actually being available.

SUMMARY OF THE INVENTION

The method according to the invention comprises the following process steps:

for each type (t) of codec, a function is determined which is specific for the relationship between the Q-equivalent $(Q_{t,n})$ over a series comprising a number (n) of codecs of that same type and the number of codecs which said series comprises;

the type sequence (t1, t2, t3, . . . ) is determined of the series of codecs such as those cascaded in the transmission medium;

the codec series is traversed in steps and, starting from the Q-equivalent $(Q_{t1,1})$ for one codec of the type (t1) which occurs as the first in the series of codecs, the Q-equivalent is always calculated over the traversed part of the series by calculating, starting from the Q-equivalent calculated last, the next Q-equivalent under the control of the function which is specific for the type of the last codec in the traversed part of the codec series.

In the method according to the invention, use is made of the observation made above that the objective MOS value (calculated via the Q-equivalent) for a series of the same codecs satisfactorily approximates to the subjective MOS value thereof. In the first step, the Q-equivalent for one codec is calculated (for each type of codec which occurs in the codec series), as well as the Q-equivalent over a plurality of codecs of that same type. The relationship between the Q-equivalent and the number of cascaded codecs is then used to calculate a Q-equivalent over the various codecs of various types. In this procedure, in a step-by-step calculation, use is made of the function which is specific for the type of said codec, namely the Q-equivalent as a function of the number of codecs (of said type) for each successive codec in the series, which function was calculated in the first step.

The method according to the invention is explained in greater detail in the next section.

BRIEF DESCRIPTION OF THE DRAWINGS

FIGS. 2 and 3 illustrate the calculations of the Q-equivalents for a pair of different series of cascaded codecs, while

Figure 1:
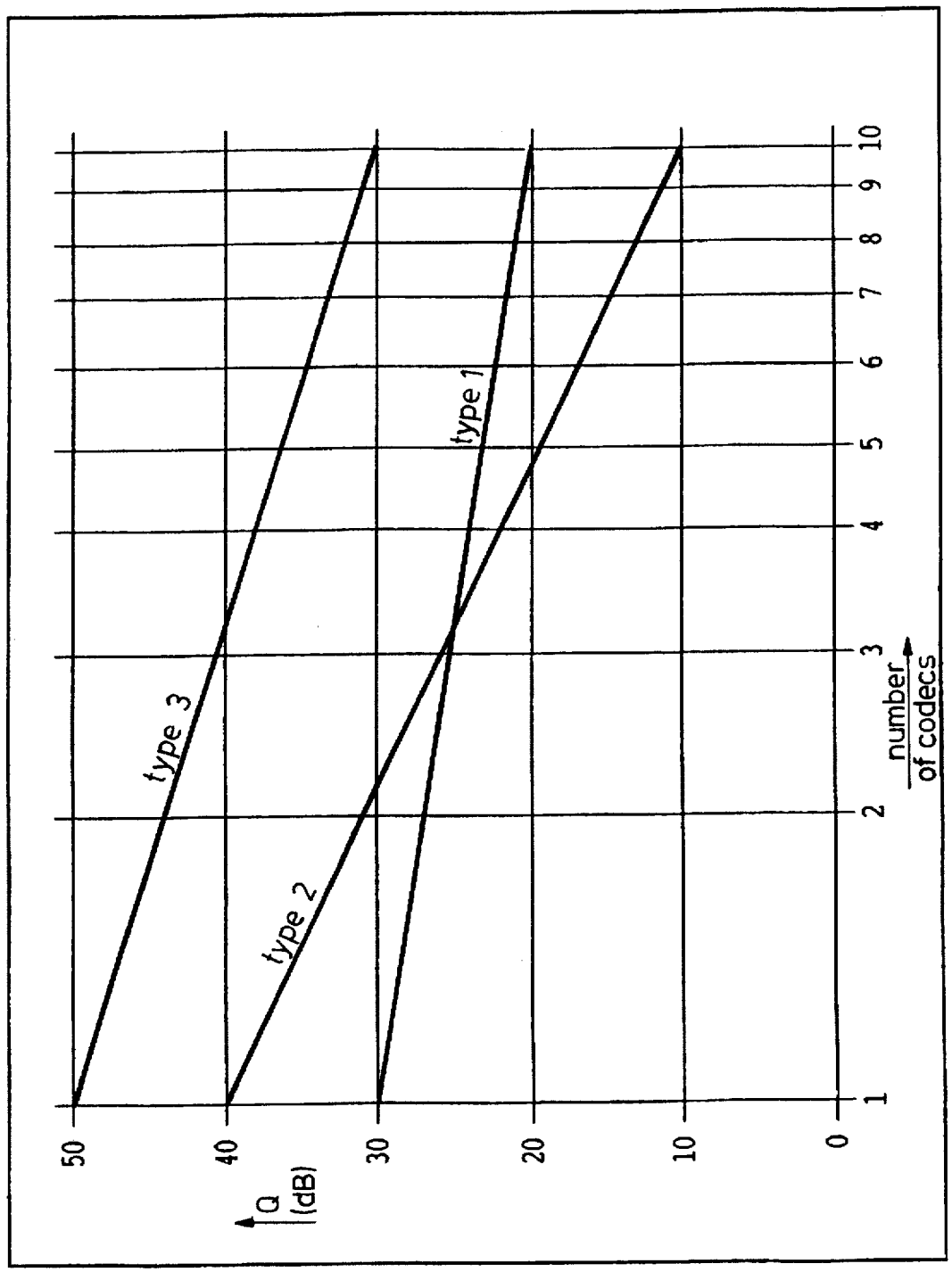
FIG. 1 shows the variation in the function of the Q-equivalent for codecs of a type 1, a type 2 and a type 3.
Figure 2:
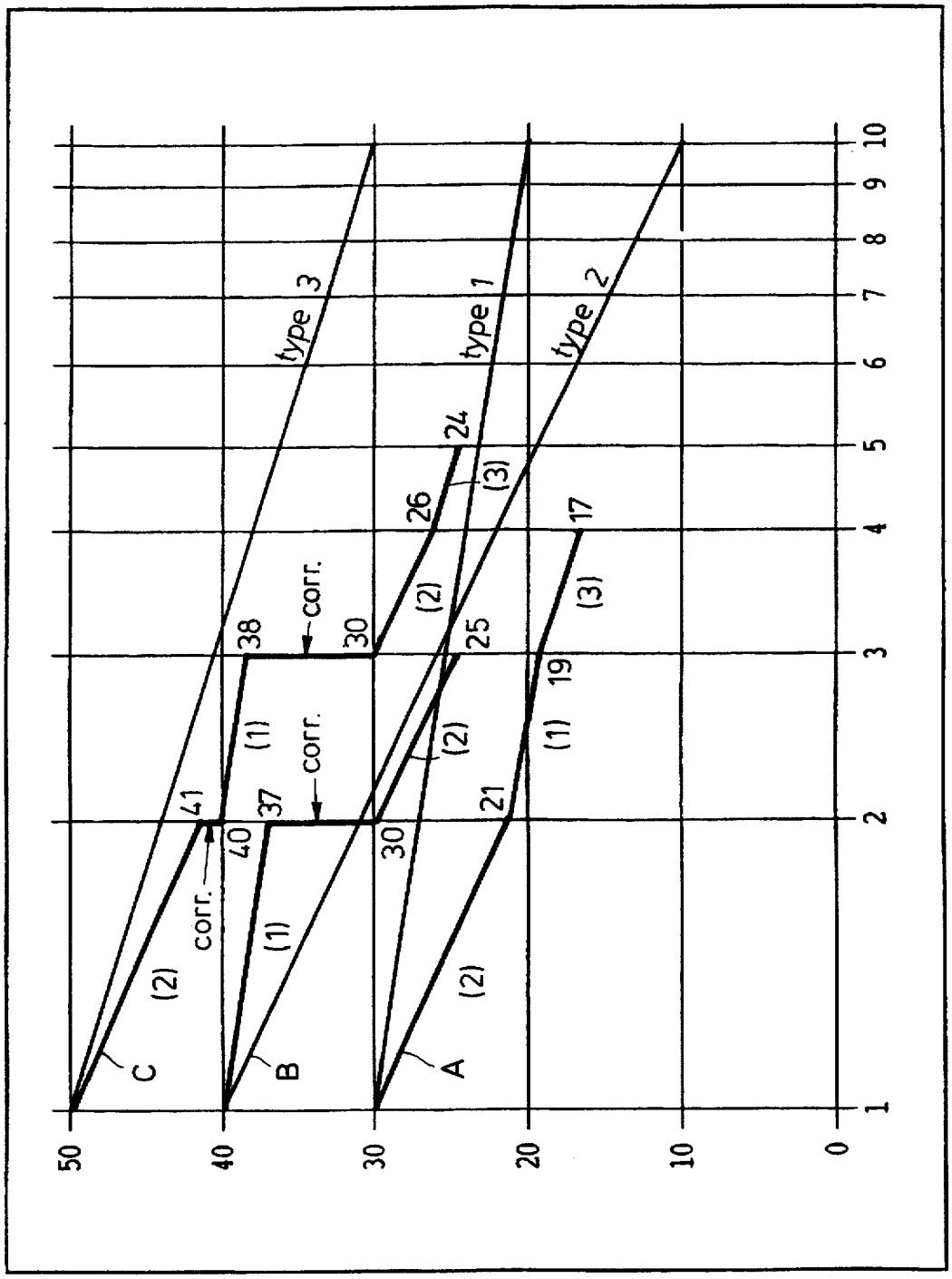
Figure 3:
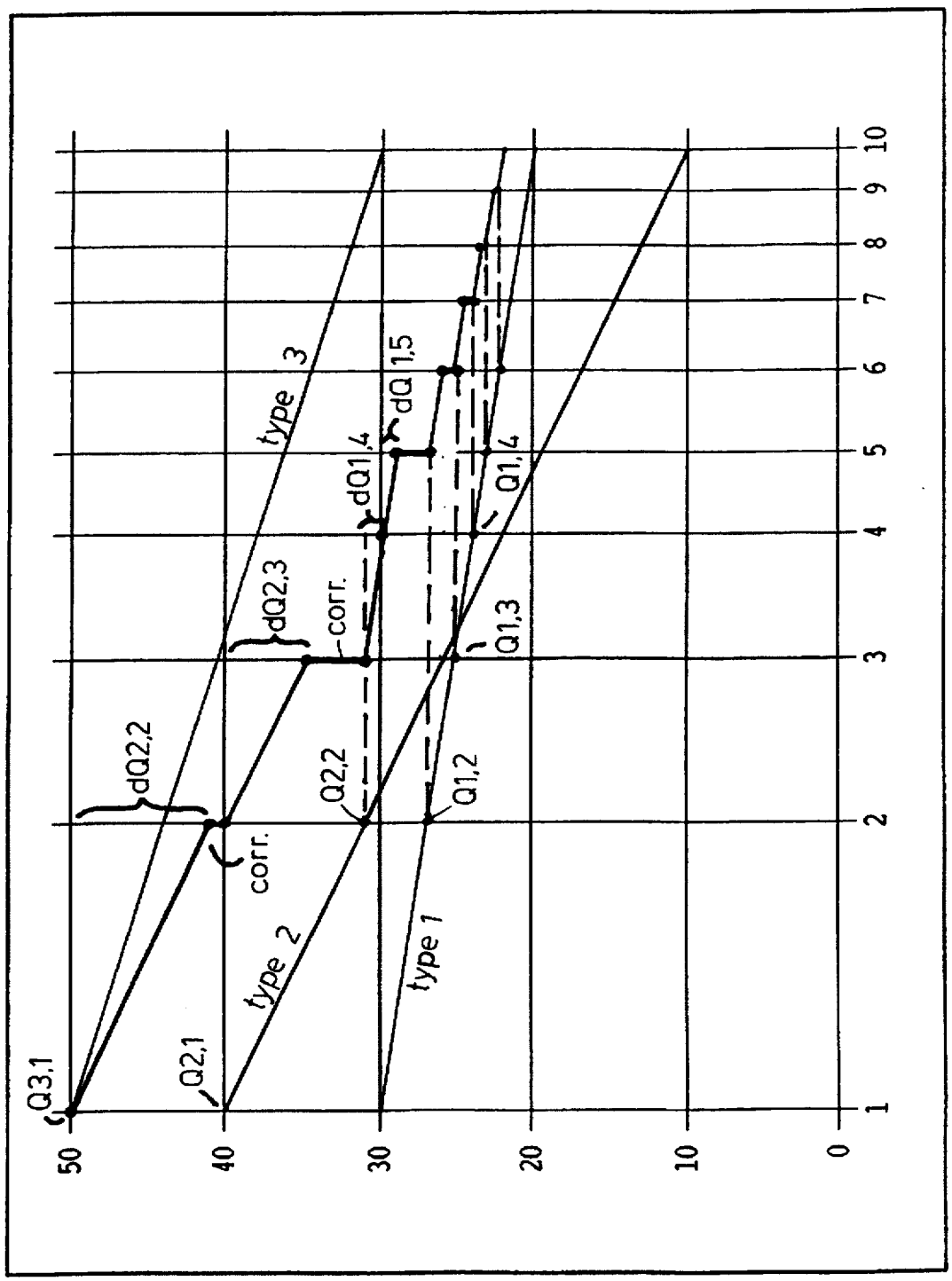

Table 1 shows the numerical values of the examples shown in FIGS. 1, 2 and 3; Table 2 shows a computer program with which Table 1 was generated.

DETAILED DESCRIPTION

FIG. 1 shows graphically the variation in the Q-equivalent, hereinafter also referred to as Q, as a function of the number of cascaded codecs for the (simulated) types 1, 2 and 3. The general form of the function for Q is: $Q_{t,n} = Q_{t,1} - R_t * \log(n)$, where t is the type, n the number of codecs and $R_t$, the direction coefficient of the slope, is plotted as n logarithmic. $Q_{t,1}$ is the Q-equivalent for one codec of type t; $Q_{t,n}$ is the Q-equivalent over n codecs of type t. As was stated above, the objective and the subjective Q-equivalents agree well with one another. The upper part of Table 1 shows the values of Q (rounded to whole numbers) as a function of n for the types 1, 2 and 3; the differential values dQ, which are of importance for the calculations below, are also presented.

FIG. 2 illustrates the method according to the invention for three different series of codecs, viz.
(Example A) type 1 - type 2 - type 1 - type 3,
(Example B) type 2 - type 1 - type 2 and
(Example C) type 3 - type 2 - type 1 - type 2 - type 3.

EXAMPLE A (Codec Series 1-2-1-3)

The series is traversed step-by-step, starting from the Q-equivalent $(Q_{t1,1})$ of the codec type which occurs as first in the series of codecs, the Q-equivalent always being calculated over the traversed part of the series by calculating, starting from the Q-equivalent last calculated, the next Q-equivalent under the control of the function which is specific to the type of the last codec in said traversed part. The process steps are therefore as follows:

The starting point is the Q-equivalent for one codec of the type which occurs as first in the series of codecs, that is to say type 1, for which $Q_{1,1} = 30$ dB;

the first step in the series terminates at the second codec in the series, which is of type 2; the Q-equivalent associated with said first step is calculated under the control of the function $(Q_{t,n} = Q_{t,1} - R_t * \log(n))$, which is specific for the type of the last codec in the traversed part of the codec series, that is to say, in this case, type 2: the Q-equivalent can now be calculated by reducing the last Q-equivalent (30 dB) in accordance with the function (Q2,n=Q2,n−R2*log(n)), which is specific for the type of the last codec (type 2) in the traversed part of the series, in other words, by reducing by dQ2,2 (see Table 1), with the result that the new Q-equivalent becomes 30−9=21 dB.

The next step in the codec series leads to a codec of type 1;

the next Q-equivalent is now calculated by starting from the value of 21 dB and reducing it in accordance with the function (Q1,n=Q1,n−R1*log(n)), which is specific for the type of the last codec (type 1) in the traversed part of the series, in other words, by reducing it by dQ1,3 (see Table 1), with the result that the new Q-equivalent becomes 21−2=19 dB.

The next step in the codec series leads to a codec of type 3;

the next Q-equivalent is now calculated by starting from the value of 19 dB and reducing it in accordance with the function (Q3,n=Q3,n−R3*log(n)), which is specific for the type of the last codec (type 3) in the traversed part of the series, in other words, by reducing it by dQ3,4 (see Table 1), with the result that the new Q-equivalent becomes 19−2=17 dB.

EXAMPLE B (Codec Series 2-1-2)

In a manner identical to the way in which the Q-equivalent is calculated in the first step through the codec series in the preceding example, the value Q2,1 (since the first codec is of type 2 in this example) is reduced by the value of dQ1,2 (the second codec is of type 1), with the result that the new Q-equivalent becomes 40−3=37. However, a problem now arises. In this case, in particular, the Q-equivalent over two codecs, one of type 2 and one of type 1, would come out higher than the Q-equivalent over one of said two, namely Q 1,1, which is 30 dB. This result must therefore be corrected. For this reason, the result of the calculation of the new Q-equivalent is compared with the Q-equivalents over one codec for both types of codec and the result corrected to the lowest value. As can be seen, this correction is only necessary once in this example. After the correction to 30 dB, the next Q-equivalent is calculated (starting from the value of 30 dB) in the manner specified above.

EXAMPLE C (Codec Series 3-2-1-2-3)

In the same way as above, starting from the Q3,1 value of 50 dB, a subsequent Q-equivalent is calculated in accordance with the function which is specific for codecs of the type 2, namely by reducing the value of 50 dB by 9 dB (dQ2,2), and the value of 41 dB thus obtained is compared with the Q-equivalent for one codec of the type 2 (Q1,2), which is 40 dB, and accordingly corrected to 40 dB. In conformity with the variation in the specific function for codecs of the type 1, said value of 40 dB is then reduced by 2 dB (dQ1,3) to 38 dB. The part of the codec series traversed now comprises the codecs 3-2-1. Since the Q-equivalent of codecs of the type 1 is 30 dB, the value of 38 dB is reduced to 30 dB. The subsequent Q-equivalents calculated no longer need to be corrected.

EXAMPLE D (Codec Series 3-2-2-1-1-1-1-1-1-1)

Figure 4:
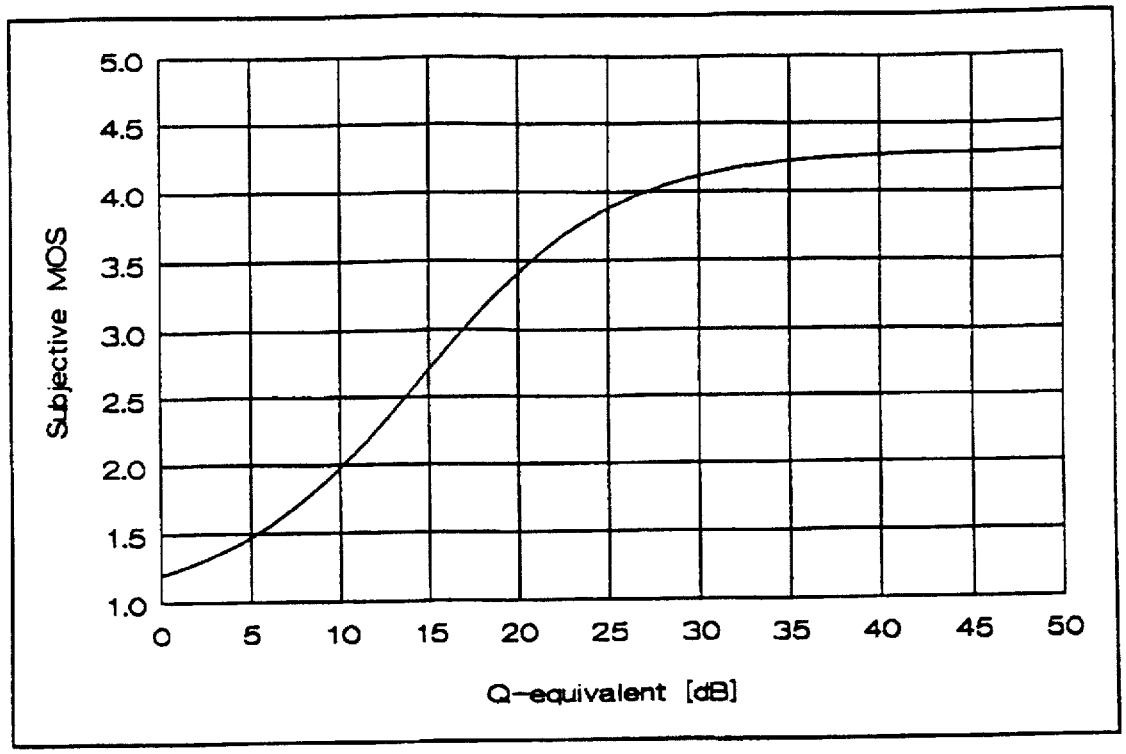
FIG. 4 shows the relationship between Q-equivalents and MOS values and FIG. 5 shows the relationship between the subjective MOS and the objective MOS, calculated in accordance with the invention, for a cascaded series encountered in practice.

Finally, FIG. 3 furthermore shows an Example D in which the calculation of the Q-equivalent of a codec series (which is probably not encountered in practice) is shown. The exemplary series is formed by codecs of the types 3-2-2-1-1-1-1-1-1-1. In this example, the correction function can readily be seen. Starting from the Q-equivalent for one code of the type 3, Q3,1, which has a value of 50 dB, during the traversing of the codec series step-by-step, this value is reduced by dQ2,2 of (see Table 1) 9 dB corrected in conformity with Q2,1 (40 dB) (since the Q-equivalent over the two codecs 3-2 will never be able to be higher than that of one codec 3 (50 dB) or 2 (40 dB)), then again reduced by dQ2,3 (in conformity with the slope (in accordance with the ratio R2) of the Q/n curve for type 2) and again corrected. In this last correction, correction is carried out in accordance with the value Q2,2: the codecs series traversed at that instant is 3-2-2 and the corrected value must therefore be compared with the Q-equivalent of one codec of type 3, Q1,3 (50 dB) and with that of two codecs of type 2, Q2,2 (31 dB). The codec series then comprises only codecs 1, with the result that, during the further step-by-step traversal of the series, the calculated Q values are always reduced in accordance with the slope of the Q/n line for type 1, the result always being compared with the Q-equivalent for the total number of codecs of type 1 in the part of the codec series traversed up to that point. As a result of the logarithmic scale of n (as a result of which the Q/n curves have a straight variation) corrections must always be carried out in this case but these are always smaller in value. In Table 1, the values are rounded to whole numbers, as a result of which the decrease in the corrections cannot be accurately followed. The Q-equivalents calculated in accordance with the above method are converted into MOS values using the curve shown in FIG. 4.

Figure 5:
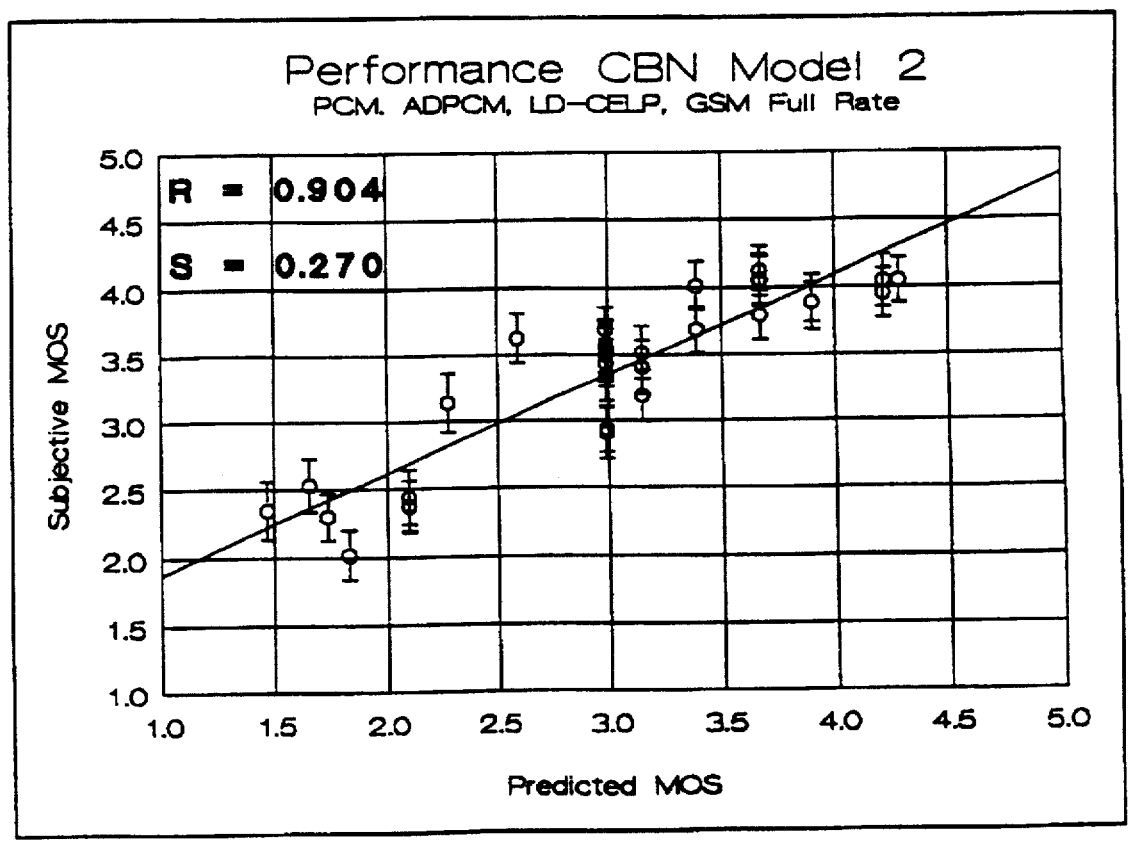

The performance of the method according to the invention is shown in FIG. 5 for a cascaded series of codecs comprising a PCM codec, an ADPCM codec, an LD-CELP codec and a GSM Full Rate codec. The figure shows the linear regression curve, correlation coefficient R and the standard deviation S.

TABLE 1

CASCADING CODECS OF THE SAME TYPE
(shown graphically in FIG. 1)

Using 1 codec of type 1 results in a Q-equivalent (Q1, 1) of 30 dB
Cascading 2 codecs of type 1 results in a Q-equivalent (Q1, 2) of 27 dB (dQ1, 2 = 3 dB)
Cascading 3 codecs of type 1 results in a Q-equivalent (Q1, 3) of 25 dB (dQ1, 3 = 2 dB)
Cascading 4 codecs of type 1 results in a Q-equivalent (Q1, 4) of 24 dB (dQ1, 4 = 1 dB)
Cascading 5 codecs of type 1 results in a Q-equivalent (Q1, 5) of 23 dB (dQ1, 5 = 1 dB)
Cascading 6 codecs of type 1 results in a Q-equivalent (Q1, 6) of 22 dB (dQ1, 6 = 1 dB)
Cascading 7 codecs of type 1 results in a Q-equivalent (Q1, 7) of 22 dB (dQ1, 7 = 1 dB)
Cascading 8 codecs of type 1 results in a Q-equivalent (Q1, 8) of 21 dB (dQ1, 8 = 1 dB)
Cascading 9 codecs of type 1 results in a Q-equivalent (Q1, 9) of 20 dB (dQ1, 9 = 1 dB)
Cascading 10 codecs of type 1 results in a Q-equivalent (Q1, 10) of 20 dB (dQ1, 10 = 0 dB)
Using 1 codec of type 2 results in a Q-equivalent (Q2, 1) of 40 dB
Cascading 2 codecs of type 2 results in a Q-equivalent (Q2, 2) of 31 dB

TABLE 1-continued (dQ2, 2 = 9 dB)
Cascading 3 codecs of type 2 results in a Q-equivalent (Q2, 3) of 26 dB
(dQ2, 3 = 5 dB)
Cascading 4 codecs of type 2 results in a Q-equivalent (Q2, 4) of 22 dB
(dQ2, 4 = 4 dB)
Cascading 5 codecs of type 2 results in a Q-equivalent (Q2, 5) of 19 dB
(dQ2, 5 = 3 dB)
Cascading 6 codecs of type 2 results in a Q-equivalent (Q2, 6) of 17 dB
(dQ2, 6 = 2 dB)
Cascading 7 codecs of type 2 results in a Q-equivalent (Q2, 7) of 15 dB
(dQ2, 7 = 2 dB)
Cascading 8 codecs of type 2 results in a Q-equivalent (Q2, 8) of 13 dB
(dQ2, 8 = 2 dB)
Cascading 9 codecs of type 2 results in a Q-equivalent (Q2, 9) of 11 dB
(dQ2, 9 = 2 dB)
Cascading 10 codecs of type 2 results in a Q-equivalent (Q2, 10) of
10 dB (dQ2, 10 = 1 dB)
Using 1 codec of type 3 results in a Q-equivalent (Q3, 1) of 50 dB
Cascading 2 codecs of type 3 results in a Q-equivalent (Q3, 2) of 44 dB
(dQ3, 2 = 6 dB)
Cascading 3 codecs of type 3 results in a Q-equivalent (Q3, 3) of 40 dB
(dQ3, 3 = 4 dB)
Cascading 4 codecs of type 3 results in a Q-equivalent (Q3, 4) of 38 dB
(dQ3, 4 = 2 dB)
Cascading 5 codecs of type 3 results in a Q-equivalent (Q3, 5) of 36 dB
(dQ3, 5 = 2 dB)
Cascading 6 codecs of type 3 results in a Q-equivalent (Q3, 6) of 34 dB
(dQ3, 6 = 2 dB)
Cascading 7 codecs of type 3 results in a Q-equivalent (Q3, 7) of 33 dB
(dQ3, 7 = 1 dB)
Cascading 8 codecs of type 3 results in a Q-equivalent (Q3, 8) of 32 dB
(dQ3, 8 = 1 dB)
Cascading 9 codecs of type 3 results in a Q-equivalent (Q3, 9) of 31 dB
(dQ3, 9 = 1 dB)
Cascading 10 codecs of type 3 results in a Q-equivalent (Q3, 10) of
30 dB (dQ3, 10 = 1 dB)
CASCADING CODECS OF THE DIFFERENT TYPES
(shown graphically in FIG. 2)

EXAMPLE A

Using 1 codec of type 1 results in a Q-equivalent of 30 dB
Cascading 2 codecs (types 1-2) results in a Q-equivalent of 21 dB
(dQ2, 2 = 9 dB)
Cascading 3 codecs (types 1-2-1) results in a Q-equivalent of 19 dB
(dQ1, 3 = 2 dB)
Cascading 4 codecs (types 1-2-1-3) results in a Q-equivalent of 17 dB
(dQ3, 4 = 2 dB)

EXAMPLE B

Using 1 codec of type 2 results in a Q-equivalent of 40 dB
Cascading 2 codecs (types 2-1) results in a Q-equivalent of 37 dB
(dQ1, 2 = 3 dB)
Idem, but corrected to the Q-equivalent of 1 codec of type 1:
30 dB (Q1, 1)
Cascading 3 codecs (types 2-1-2) results in a Q-equivalent of 25 dB
(dQ2, 3 = 5 dB)

EXAMPLE C

Using 1 codec of type 3 results in a Q-equivalent of 50 dB
Cascading 2 codecs (types 3-2) results in a Q-equivalent of 41 dB
(dQ2, 2 = 9 dB)
Idem, but corrected to the Q-equivalent of 1 codec of type 2: 40 dB
(Q2, 1)
Cascading 3 codecs (types 3-2-1) results in a Q-equivalent of 38 dB
(dQ1, 3 = 2 dB)
Idem, but corrected to the Q-equivalent of 1 codec of type 1: 30 dB
(Q1, 1)
Cascading 4 codecs (types 3-2-1-2) results in a Q-equivalent of 26 dB
(dQ2, 4 = 4 dB)
Cascading 5 codecs (types 3-2-1-2-3) results in a Q-equivalent of 24 dB
(dQ3, 5 = 2 dB)

EXAMPLE D

Using 1 codec of type 3 results in a Q-equivalent of 50 dB
Cascading 2 codecs (types 3-2) results in a Q-equivalent of 41 dB
(dQ2, 2 = 9 dB)
Idem, but corrected to the Q-equivalent of 1 codec of type 2:
40 dB (Q2, 1)
Cascading 3 codecs (types 3-2-2) results in a Q-equivalent of 35 dB
(dQ2, 3 = 5 dB)
Idem, but corrected to the Q-equivalent of 2 codecs of type 2:
31 dB (Q2, 2)
Cascading 4 codecs (types 3-2-2-1) results in a Q-equivalent of 30 dB
(dQ1, 4 = 1 dB)
Cascading 5 codecs (types 3-2-2-1-1) results in a Q-equivalent of 29 dB
(dQ1, 5 = 1 dB)
Idem, but corrected to the Q-equivalent of 2 codecs of type 1:
27 dB (Q1, 2)
Cascading 6 codecs (types 3-2-2-1-1-1) results in a Q-equivalent of
26 dB (dQ1, 6 = 1 dB)
Idem, but corrected to the Q-equivalent of 3 codecs of type 1:
25 dB (Q1, 3)
Cascading 7 codecs (types 3-2-2-1-1-1-1) results in a Q-equivalent of
25 dB (dQ1, 7 = 1 dB)
Idem, but corrected to the Q-equivalent of 4 codecs of type 1:
24 dB (Q1, 4)
Cascading 8 codecs (types 3-2-2-1-1-1-1-1) results in a Q-equivalent of
23 dB (dQ1, 8 = 1 dB)
Idem, but corrected to the Q-equivalent of 5 codecs of type 1:
23 dB (Q1, 5)
Cascading 9 codecs (types 3-2-2-1-1-1-1-1-1) results in a Q-equivalent
of
22 dB (dQ1, 9 = 1 dB)
Idem, but corrected to the Q-equivalent of 6 codecs of type 1:
22 dB (Q1, 6)
Cascading 10 codecs (types 3-2-2-1-1-1-1-1-1-1) results in a
Q-equivalent of 22 dB (dQ1, 10 = 0 dB)
Idem, but corrected to the Q-equivalent of 7 codecs of type 1:
22 dB (Q1, 7)

TABLE 2

```
OPEN "CBN.PRT" FOR OUTPUT AS #1
REM    Calculating Q-equivalent/number of codecs - ratio over 10 codecs
Q(1, 1) = 30: Q(1, 10) = 20: R(1) = (Q(1, 1)-Q(1, 10))
Q(2, 1) = 40: Q(2, 10) = 10: R(2) = (Q(2, 1)-Q(2, 10))
Q(3, 1) = 50: Q(3, 10) = 30: R(3) = (Q(3, 1)-Q(3, 10))
REM    Calculating Q and delta-Q at increasing number of codecs of the
same type
PRINT #1, "CASCADING CODECS OF THE SAME TYPE (shown
graphically in FIG. 1)"
FOR t = 1 TO 3
Qprev = Q(t, 1)
FOR n = 1 TO 10
Q(t, n) = Q(t, 1) - R(t) * LOG(n) / LOG(10)
d(t, n) = Qprev - Q(t, n)
IF n = 1 THEN PRINT #1, USING " Using 1 codec of type # results
in a Q-equivalent (Q#&1) of ## dB"; t; t; ","; Q(t, 1)
IF n > 1 THEN PRINT #1, USING "Cascading ## codecs of type #
results
in a Q-equivalent (Q#&#) of ## dB (dQ#&#=# dB)"; n; t; t; ","; n;
Q(t, n); t; ","; n; d(t, n)
Qprev = Q(t, n)
NEXT n
NEXT t
REM    Stepwise calculating Q of a codec string consisting of codecs of
the different types
PRINT #1, "CASCADING CODECS OF THE DIFFERENT TYPES
(shown graphically in FIG. 2)"
CS$(1) = "1-2-1-3":      xmpl$(1) = "A"
CS$(2) = "2-1-2":        xmpl$(2) = "B"
CS$(3) = "3-2-1-2-3":    xmpl$(3) = "C"
CS$(4) = "3-2-2-1-1-1-1-1-1-1":  xmpl$(4) = "D"
FOR a = 1 TO 4: CS$ = CS$(a)
PRINT #1, USING "EXAMPLE &"; xmpl$(a)
b = 0
FOR c = 1 TO LEN(CS$)
IF VAL(MID$(CS$, c, 1)) >0 THEN b = b + 1: t(b) = VAL(MID$(CS$,
c, 1))
NEXT c
Qprev = Q(t(1), 1): Qcorr= Q(t(1), 1)
FOR n = 1 TO b
t = t(n)
t$(n) = STR$(t(n))
Q = Qprev - d(t, n)
```

TABLE 2-continued

```
IF n = 1 THEN PRINT #1, USING "  Using 1 codec of type # results
in a Q-equivalent of ## dB"; t; Q
IF n > 1 THEN PRINT #1, USING "Cascading # codecs (types &) results
in a Q-equivalent of ## dB (dQ#&#=# dB)"; n; LEFT$(CS$,
2 * n − 1); Q; t; ","; n; d(t, n)
FOR d = 1 TO 3: e(d) = 0: NEXT d
FOR c = 1 TO n: FOR d = 1 TO 3
IF t(c) = d THEN e(d) = e(d) + 1: Qcorr(d) = Q(d, e(d)): IF
Qcorr(d) < Qcorr THEN Qcorr = Qcorr(d): dcorr = d: ncorr = e(d)
NEXT d: NEXT c
FOR b = 2 TO n
IF (n > 1) AND (Q > Qcorr) THEN d = Q − Qcorr: Q = Qcorr: IF
ncorr = 1 THEN PRINT #1, USING "  Idem, but corrected to the
Q-equivalent of # codec of type #: ## dB (Q#&#)"; ncorr; dcorr; Q; dcorr;
","; ncorr: ELSE PRINT #1, USING "  Idem, but corrected to the
Q-equivalent of # codecs of type #: ## dB (Q#&#)"; ncorr; dcorr;
Q; dcorr; ","; ncorr
NEXT b
Qprev = Q
NEXT n
NEXT a
CLOSE
```

We claim:

1. A method of calculating the transmission quality of a transmission medium which contains a series of cascaded codecs, comprising the steps of:
   a) determining, for each type (t) of codec, a function specific to a relationship between a number (n) of codecs of a same type and a Q-equivalent (Qt,n) over the number (n) of codecs of the same type;
   b) determining a type sequence (t1, t2, t3, . . . ) of the series of codecs which are cascaded in the transmission medium; and
   c) traversing the codec series step-by step and, starting from a Q-equivalent (Qt1,1) for a first codec of a type (t1) which occurs as a first codec type in the series of codecs, calculating a Q-equivalent over the traversed part of the series by calculating, starting from a Q-equivalent calculated last, a next Q-equivalent in accordance with the determined function specific to the type (t) of a last codec in the traversed part of the codec series.

2. A method according to claim 1, wherein said step a) comprises calculating, for each type of codec (t), a ratio (Rt) between: i) a difference between a Q-equivalent (Qt,n1) of a first number (n1) of cascaded codecs of the type (t) and a Q-equivalent (Qt,n2) of a second number (n2) of cascaded codecs of the type (t), and ii) a logarithm of the difference between said first and said second number of codecs of the type (t), as follows: Rt=(Qt,n1−Qt,n2)/log(n1−n2).

3. A method according to claim 2, wherein said ratio (Rt) is calculated by calculating the difference between a Q-equivalent (Qt,1) of one codec of the type (t) and a Q-equivalent (Qt,10) of ten cascaded codecs of the type (t).

4. A method according to claim 2, wherein:
   said step b) comprises calculating, for each type (t) of codec, differences (dQt,n) between successive Q-equivalents; and
   said step c) comprises calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the type (t) of the last codec in the traversed part of the series.

5. A method according to claim 4, wherein the difference (dQt,n) for the number (n) of codecs in the traversed part of the series is subtracted from the Q-equivalent calculated last.

6. A method according to claim 2, wherein said step c) comprises comparing the Q-equivalent calculated last with a Q-equivalent for each codec type (t) calculated for the number (n) of codecs of the codec type which occurs in the traversed part of the codec series, and wherein, if one or more of said Q-equivalents has a lower value for each codec type (t) than the Q-equivalent calculated last, the former is corrected and is equated to a lowest of the Q-equivalents for each codec type (t).

7. A method according to claim 3, wherein:
   said step b) comprises calculating, for each type (t) of codec, differences (dQt,n) between successive Q-equivalents; and
   said step c) comprises calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the type (t) of the last codec in the traversed part of the series.

8. A method according to claim 7, wherein the difference (dQt,n) for the number (n) of codecs in the traversed part of the series is subtracted from the Q-equivalent calculated last.

9. A method according to claim 1, further comprising calculating an objective mean opinion score (MOS) of the series of cascaded codecs based on the calculated Q-equivalent over the series of codecs.

10. A method according to claim 1, further comprising the step of:
   d) arranging a series of codecs corresponding to the traversed codec series so that said arranged series of codecs has a Q-equivalent corresponding to the calculated Q-equivalent of the traversed codec series.

11. A device for calculating the transmission quality of a transmission medium which contains a series of cascaded codecs, comprising:
   means for determining, for each type (t) of codec, a function specific to a relationship between a number (n) of codecs of a same type and a Q-equivalent (Qt,n) over the number (n) of codecs of the same type;
   means for determining a type sequence (t1, t2, t3, . . . ) of the series of codecs which are cascaded in the transmission medium; and
   means for traversing the codec series step-by step and, starting from a Q-equivalent (Qt1,1) for a first codec of a type (t1) which occurs as a first codec type in the series of codecs, calculating a Q-equivalent over the traversed part of the series by calculating, starting from a Q-equivalent calculated last, a next Q-equivalent in accordance with the determined function specific to the type (t) of a last codec in the traversed part of the codec series.

12. A device according to claim 11, wherein said means for determining the specific function for each type (t) of codec comprises means for calculating, for each type of codec (t), a ratio (Rt) between: i) a difference between a Q-equivalent (Qt,n1) of a first number (n1) of cascaded codecs of the type (t) and a Q-equivalent (Qt,n2) of a second number (n2) of cascaded codecs of the type (t), and ii) a logarithm of the difference between said first and said second number of codecs of the type (t), as follows: Rt=(Qt,n1−Qt,n2)/log(n1−n2).

13. A device according to claim 12, wherein said means for calculating the ratio (Rt) includes means for calculating the difference between a Q-equivalent (Qt,1) of one codec of the type (t) and a Q-equivalent (Qt,10) of ten cascaded codecs of the type (t).

14. A device according to claim 12, wherein:

said means for determining the type sequence of the series of codecs comprises means for calculating, for each type (t) of codec, differences (dQt,n) between successive Q-equivalents; and said means for traversing the codec series step-by step comprises means for calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the type (t) of the last codec in the traversed part of the series.

15. A device according to claim 14, wherein said means for traversing the codec series step-by step comprises means for calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the number (n) of codecs in the traversed part of the series.

16. A device according to claim 12, wherein said means for traversing the codec series step-by step comprises means for comparing the Q-equivalent calculated last with a Q-equivalent for each codec type (t) calculated for the number (n) of codecs of the codec type which occurs in the traversed part of the codec series, and wherein, if one or more of said Q-equivalents has a lower value for each codec type (t) than the Q-equivalent calculated last, the former is corrected and is equated to a lowest of the Q-equivalents for each codec type (t).

17. A device according to claim 13, wherein:

said means for determining the type sequence of the series of codecs comprises means for calculating, for each type (t) of codec, differences (dQt,n) between successive Q-equivalents; and said means for traversing the codec series step-by step comprises means for calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the type (t) of the last codec in the traversed part of the series.

18. A device according to claim 17, wherein said means for traversing the codec series step-by step comprises means for calculating the Q-equivalent over the traversed part of the series, starting from the Q-equivalent (Qt1,1) for the first codec of the first type (t1) which occurs as the first codec type in the series of codecs, by subtracting from the Q-equivalent calculated last the difference (dQt,n) for the number (n) of codecs in the traversed part of the series.

19. A device according to claim 11, further comprising means for calculating an objective mean opinion score (MOS) of the series of cascaded codecs based on the calculated Q-equivalent over the series of codecs.

20. A method according to claim 11, further comprising means for arranging a series of codecs corresponding to the traversed codec series so that said arranged series of codecs has a Q-equivalent corresponding to the calculated Q-equivalent of the traversed codec series.

* * * * *